United States Patent
Hortop

(10) Patent No.: US 6,582,840 B2
(45) Date of Patent: Jun. 24, 2003

(54) FUEL CELL STACK COOLANT CONDUCTIVITY SENSOR USING DIFFERENTIAL VOLTAGE MEASUREMENTS

(75) Inventor: Matthew K. Hortop, Rochester, NY (US)

(73) Assignee: General Motors Corporation, Detroit, MI (US)

( * ) Notice: Subject to any disclaimer, the term of this patent is extended or adjusted under 35 U.S.C. 154(b) by 194 days.

(21) Appl. No.: 09/756,321

(22) Filed: Jan. 8, 2001

(65) Prior Publication Data

US 2002/0094460 A1 Jul. 18, 2002

(51) Int. Cl.⁷ ................................................. H01M 8/04
(52) U.S. Cl. ............................ 429/13; 429/22; 429/26; 324/98; 324/439
(58) Field of Search ............................ 429/13, 22, 26; 324/98, 439

(56) References Cited

U.S. PATENT DOCUMENTS

| | | | | |
|---|---|---|---|---|
| 3,879,218 A | * | 4/1975 | Kellen et al. ................. | 429/22 |
| 3,969,145 A | * | 7/1976 | Grevstad et al. .............. | 429/26 |
| 5,763,113 A | | 6/1998 | Meltser et al. ................ | 429/13 |
| 5,776,624 A | | 7/1998 | Neutzler ....................... | 429/26 |

FOREIGN PATENT DOCUMENTS

| | | | | |
|---|---|---|---|---|
| JP | 2-270267 | * | 11/1990 | ............ H01M/8/04 |
| JP | 06 140066 A | | 5/1994 | |
| JP | 8-315846 | * | 11/1996 | ............ H01M/8/04 |
| JP | 09 022716 A | | 1/1997 | |
| JP | 09 092317 A | | 4/1997 | |
| JP | 10-284104 | * | 10/1998 | ............ H01M/8/04 |

* cited by examiner

*Primary Examiner*—Stephen Kalafut
(74) *Attorney, Agent, or Firm*—Karl F. Barr, Jr.; Cary W. Brooks; Linda M. Deschere

(57) ABSTRACT

A method and apparatus for detecting leakage current in the coolant of a fuel cell stack. The invention eliminates the use of a conductivity sensor by using a voltmeter to measure the voltage across the coolant. If the coolant voltage is at or below a predetermined level, an excessive level of conductivity in the coolant exists, and the presence of leakage current is reported. The invention can also compare the coolant voltage to two different predetermined voltage levels, the second one higher than the first. A coolant voltage at or below the lower voltage level could signal a shut down of the stack, while a coolant voltage at or below the higher voltage level could signal an alarm or another diagnostic. The invention can optionally use a second voltmeter to measure the voltage across the stack and calculate the resistivity and conductivity of the coolant.

9 Claims, 3 Drawing Sheets

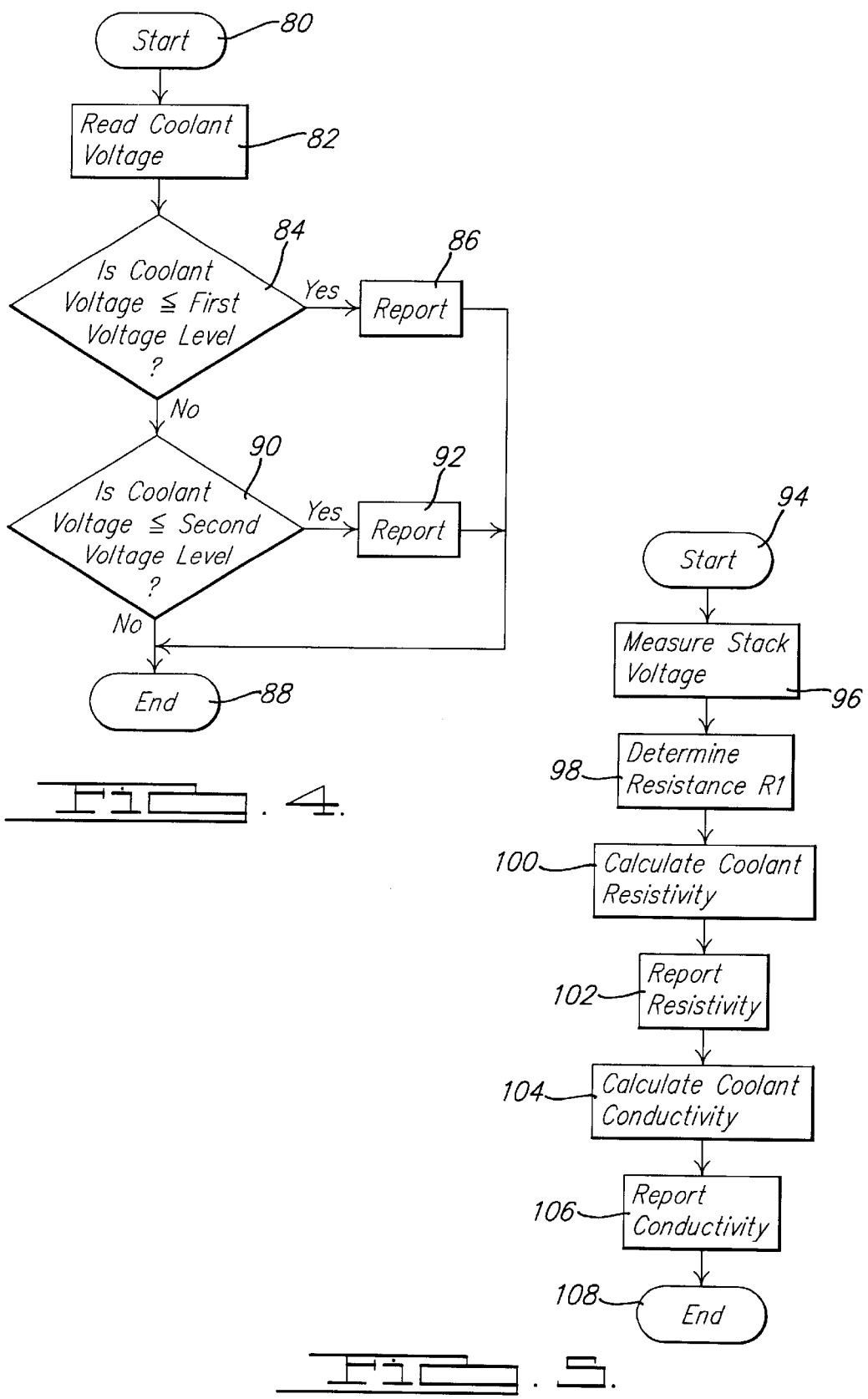

FUEL CELL STACK COOLANT CONDUCTIVITY SENSOR USING DIFFERENTIAL VOLTAGE MEASUREMENTS

FIELD OF THE INVENTION

This invention relates, in general, to a fuel cell system and, more particularly, to the detection of leakage current in the coolant of a fuel cell system.

BACKGROUND OF THE INVENTION

Fuel cells have been used as a power source in many applications. For example, fuel cells have been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive solid polymer electrolyte membrane having the anode catalyst on one of its faces and the cathode catalyst on the opposite face. The MEA is sandwiched between a pair of electrically conductive elements which (1) serve as current collectors for the anode and cathode, and (2) contain appropriate channels and/or openings therein for distributing the fuel cell's gaseous reactants over the surfaces of the respective anode and cathode catalysts. The term fuel cell is typically used to refer to either a single cell or a plurality of cells (stack) depending on the context. A plurality of individual cells are commonly bundled together to form a fuel cell stack and are commonly arranged in series. Each cell within the stack comprises the membrane electrode assembly (MEA) described earlier, and each such MEA provides its increment of voltage. A group of adjacent cells within the stack is referred to as a cluster. Typical arrangements of multiple cells in a stack are described in U.S. Pat. No. 5,763,113.

In PEM fuel cells, hydrogen ($H_2$) is the anode reactant (i.e., fuel) and oxygen is the cathode reactant (i.e., oxidant). The oxygen can be either a pure form ($O_2$), or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, and mixed with a proton conductive resin. The catalytic particles are typically costly precious metal particles. These MEAs are relatively expensive to manufacture and require certain conditions, including proper water management and humidification, and control of catalyst fouling constituents such as carbon monoxide (CO), for effective operation.

The electrically conductive elements sandwiching the MEAs may contain an array of grooves in the faces thereof for distributing the fuel cell's gaseous reactants (i.e., hydrogen and oxygen in the form of air) over the surfaces of the respective cathode and anode. In the fuel cell stack, a plurality of cells are stacked together in electrical series while being separated one from the next by a gas impermeable, electrically conductive bipolar plate. Heretofore, the bipolar plate has served several functions including (1) as an electrically conductive gas separator element between two adjacent cells; (2) to distribute reactant gases across substantially the entire surface of the membrane; (3) to conduct electrical current between the anode of one cell and the cathode of the next adjacent cell in the stack; (4) to keep the reactant gases separated in order to prevent auto ignition; (5) to provide a support for the proton exchange membrane; and (6) in most cases, to provide internal cooling passages therein defined by internal heat exchange faces and through which a coolant flows to remove heat from the stack.

Current fuel cell technology requires a low conductivity (high resistance) coolant to prevent leakage current from flowing between the stack in the remainder of the system. Leakage current flowing through the coolant can cause short circuiting, induce galvanic corrosion and electrolyze the coolant, reducing engine efficiency. Generally non-corrosive coolants such as water, antifreeze, or mixtures thereof, etc., are used in the bipolar plates. Over time, however, the internal heat exchange faces of the bipolar plates begin to dissolve. The dissolution of even small parts of material from the bipolar plates into the coolant can cause the coolant to become excessively conductive, resulting in excessive leakage current.

Heretofore, coolant conductivity has been monitored using a sensor that is specific to conductivity measurement. The sensor indicates the level of conductivity (or resistivity) of the coolant whereupon an electronic controller decides whether the measured level is sufficient to prevent large leakage current. Therefore, the prior method does not measure the leakage current, only one potential cause of it. The sensors do not detect other faults, such as a short circuit across the stack. Also, because the coolant conductivity sensors are purchased and calibrated specifically for the coolant being used and require specific mounting hardware and orientation, they are relatively expensive and difficult to install. Finally, these sensors require a finite reaction time to make their measurements and have a potential to "drift" in their measurement of conductivity over time, decreasing their ability to reliably detect conductivity under all circumstances.

SUMMARY OF THE INVENTION

The present invention provides a method and apparatus for detecting the presence of leakage current in the coolant of a fuel cell stack without using a coolant conductivity sensor.

The method of the present invention detects the presence of leakage current by disposing a fixed resistance from the negative terminal of the fuel cell stack to the fuel cell stack chassis and measuring a voltage between the positive and chassis which is electrically connected via the coolant path. Then, comparing the measured voltage to a first predetermined voltage limit, and reporting when the voltage is at or below the first predetermined voltage limit. Lower voltages indicate higher leakage currents in the coolant. In one aspect of the invention, the first predetermined voltage limit is zero volts, indicating a short circuit across the stack.

In another aspect method of the present invention, the coolant voltage is compared to a second predetermined voltage limit and a report is made when the coolant voltage is at or below that limit.

The apparatus of the present invention comprises a first voltage measuring device for measuring the coolant voltage between the positive and chassis which is electrically connected via the coolant path, and a fixed resistance disposed between the negative terminal and the stack chassis. In another aspect of apparatus of the present invention, a second voltage measuring device measures the fuel cell stack voltage between the positive terminal and the negative terminal of a fuel cell stack. The apparatus also comprises means for comparing the coolant voltage to a first predetermined voltage limit and, in one aspect, to a second predetermined voltage limit, and means for reporting when the coolant voltage is at or below the predetermined voltage limit(s).

According to an optional aspect of the present invention, the resistivity of the coolant is calculated by measuring the stack voltage from the positive terminal of the stack to the negative terminal of the stack, calculating the resistance of the coolant, and using the resistance of the coolant and the physical parameters of the system to calculate the resistivity of the coolant from the resistance. Once the resistivity is calculated, the conductivity can also be calculated by taking the reciprocal of the resistivity.

The present invention replaces the conductivity sensor with relatively cheap components, namely a resistor and one or more voltage measuring devices. Expense is further reduced because the invention can be adapted for installation on any system quickly and easily because it requires no specific orientation or calibration for the type of coolant being used. The detection of excessive leakage currents is more reliable because reaction time is faster than with the prior conductivity sensor and, further, devices that measure voltage are less likely to "drift" over time. The present invention is also intended to detect other problems with the stack. For example, if any point in the system comes in contact with the stack (i.e., dropped hardware, rags, broken equipment), the system will detect this as a ground fault. The prior conductivity sensor indicates only that the coolant may be conductive.

BRIEF DESCRIPTION OF THE DRAWINGS

The various features, advantages and other uses of the present invention will become more apparent by referring to the following description and drawings in which:

FIG. 4 is a flow diagram illustrating one aspect of the method of the present invention; and FIG. 5 is a flow diagram illustrating an optional aspect of the method of the present invention.

DETAILED DESCRIPTION OF THE PREFERRED EMBODIMENTS

Figure 1:
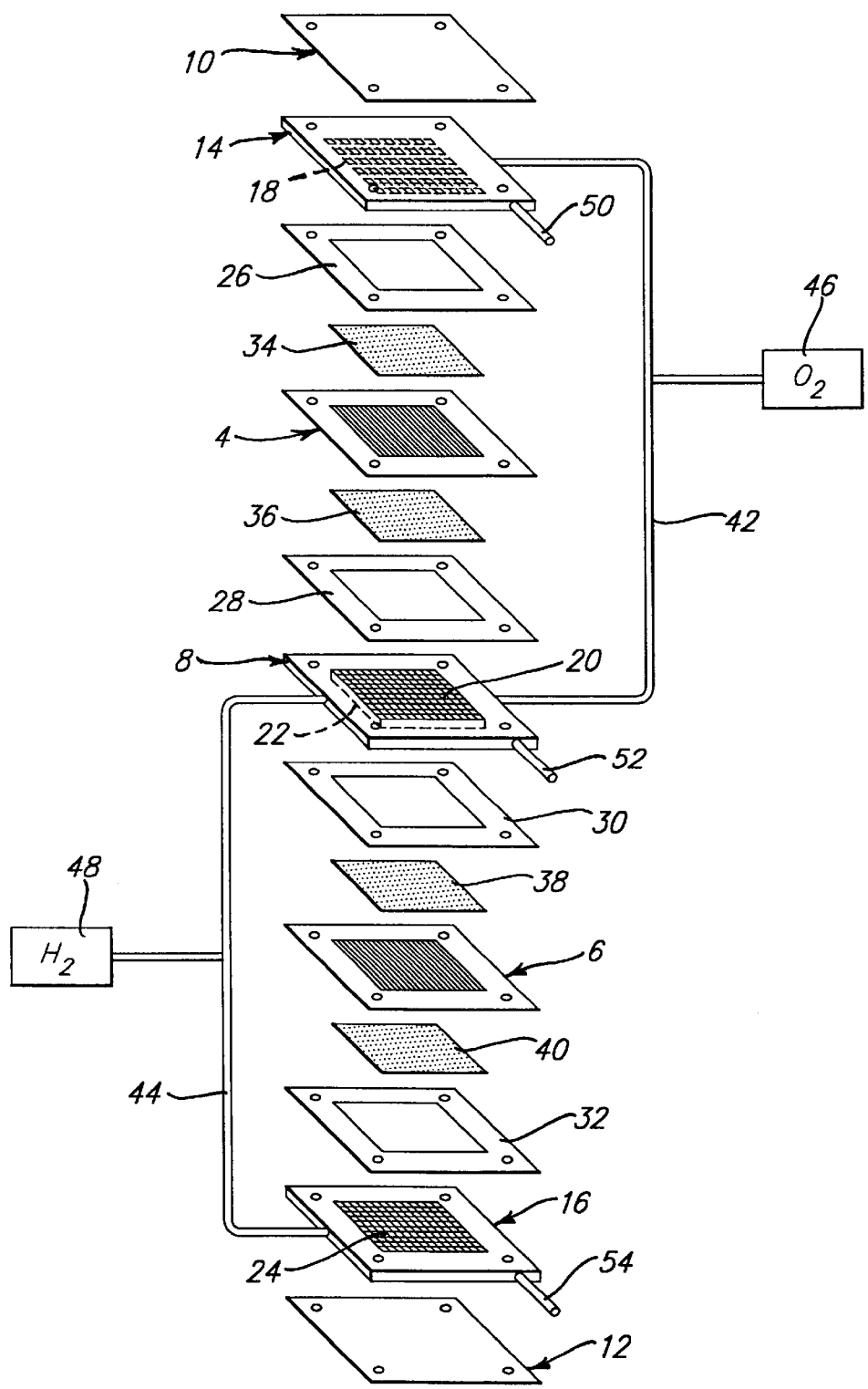
FIG. 1 is a schematic, isometric, exploded illustration of a liquid-cooled PEM fuel stack.

Before further describing the invention, it is useful to understand the system within which the invention operates, as shown in FIG. 1. The fuel cell system shown in FIG. 1 is a two-cell, bipolar proton exchange membrane (PEM) type fuel cell stack having a pair of membrane electrode assemblies (MEAs) 4 and 6 separated from each other by an electrically conductive, liquid cooled, bipolar plate 8. The MEAs 4 and 6, and bipolar plate 8, are stacked together between stainless steel clamping plates 10 and 12 and end contact elements 14 and 16. The end contact elements 14 and 16, as well as the bi-polar plate 8, contain a plurality of grooves and openings 18, 20, 22, and 24 for distributing fuel and oxidant gases (i.e., $H_2$ and $O_2$) to the MEAs 4 and 6. Nonconductive gaskets 26, 28, 30 and 32 provide seals and electrical insulation between the several components of the fuel cell stack. Into the clamping plates 10 and 12 are disposed connectors (not shown) for electrical connections.

Figure 3:
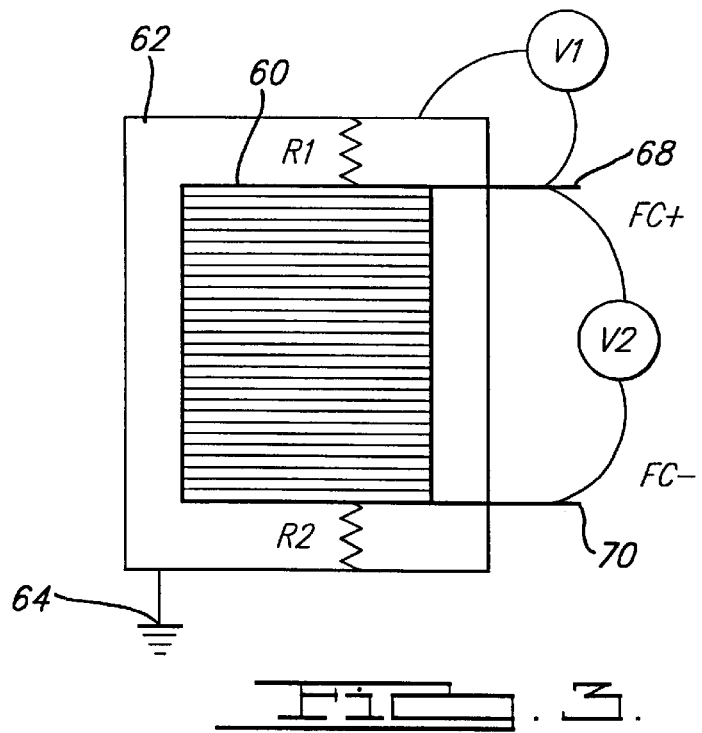
FIG. 3 is a schematic diagram of one aspect of the apparatus of the present invention.

The connectors in clamping plates 10 and 12 provide positive and negative terminals, shown in FIG. 3, for the fuel cell stack.

Returning to FIG. 1, gas permeable carbon/graphite diffusion papers 34, 36, 38 and 40 press up against the electrode faces of the MEAs 4 and 6. The end contact elements 14 and 16 press up against the carbon/graphite papers 34 and 40, respectively, while the bipolar plate 8 presses up against the carbon/graphite paper 36 on the anode face of MEA 4, and against carbon/graphite paper 38 on the cathode face of MEA 6. Oxygen is supplied to the cathode side of the fuel cell stack from storage tank 46 the appropriate supply plumbing 42, while hydrogen is supplied to the anode side of the fuel cell from storage tank 48 via appropriate supply plumbing 44. Alternatively, air may be supplied to the cathode side from the ambient and hydrogen to the anode from a methanol reformer or the like. Exhaust plumbing (not shown) for both the $H_2$ and $O_2$/air sides of the MEAs will also be provided. Additional plumbing 50, 52 and 54 is provided for supplying liquid coolant to the bipolar plate 8 and end plates 14 and 16. Appropriate plumbing for exhausting coolant from the bipolar plate 8 and end plates 14 and 16 is also provided, but not shown. The fuel cell stack is supported by a stack chassis, shown in FIG. 3.

The fuel cell shown is fueled by an $H_2$-rich reformate regardless of the method by which such reformate is made. It is to be understood that the principles embodied herein are applicable to fuel cells fueled by $H_2$ obtained from any source, including reformable hydrocarbon and hydrogen-containing fuels, such as methanol, ethanol, gasoline, alkene, or other aliphatic or aromatic hydrocarbons, or from fuel stored on board, such as $H_2$.

Figure 2:
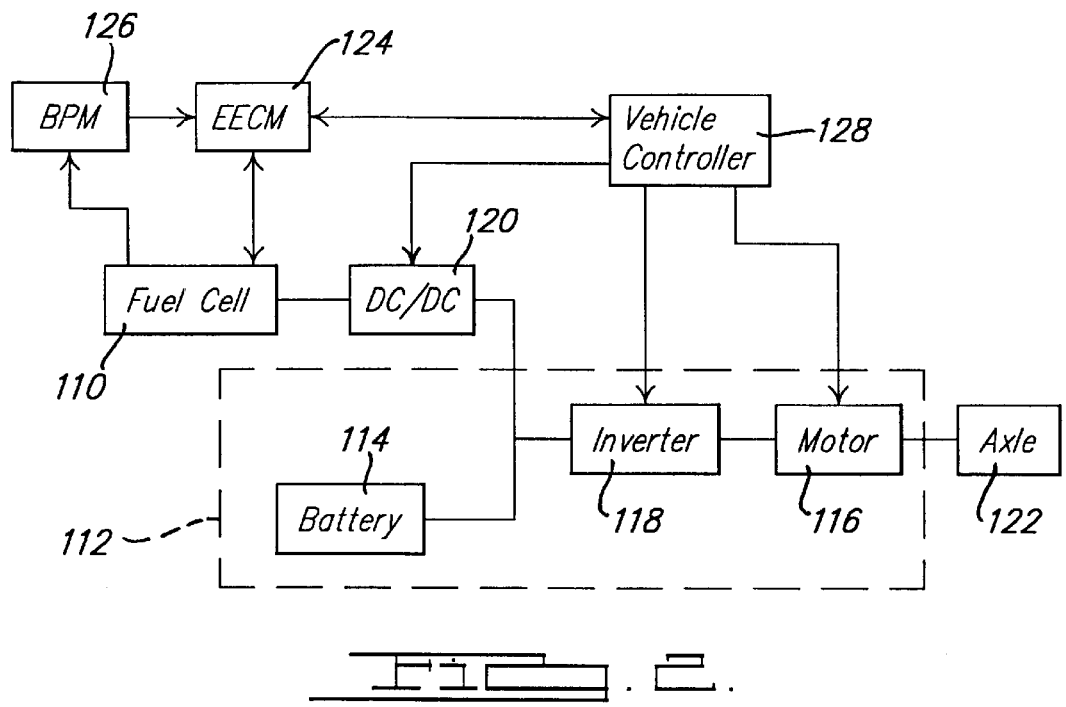
FIG. 2 is a drawing the fuel cell stack shown in FIG. 1 connected in a pictorial representation of a use application.

FIG. 2 shows a preferred embodiment, where the fuel cell system comprises the fuel cell stack 110 shown in FIG. 1 as part of a vehicle propulsion system 112. Here, a portion of the system 112, comprises a battery 114, an electric motor 116, and associated drive electronics including inverter 118 constructed and arranged to accept electric energy from a DC/DC converter 120 associated with the fuel cell system, and particularly fuel cell stack 110, and to convert it to mechanical energy produced by motor 116. The battery 114 is constructed and arranged to accept and store electrical energy supplied by fuel cell stack 110 and to accept and store electrical energy supplied by motor 116 during regenerative braking, and to provide electric energy to motor 116. The motor 116 is coupled to driving axle 122 to rotate wheels of a vehicle (not shown). An electrochemical engine control module (EECM) 124 and a battery pack module (BPM) 126 monitor various operating parameters, including, but not limited to, the voltage and current of the stack. For example, this is done by the BPM 126, or by the BPM 126 and the EECM 124 together, to send an output signal (message) to the vehicle controller 128 based on conditions monitored by the BPM 126. The vehicle controller 128 controls the electric motor 116, the drive electronics including inverter 118, the DC/DC converter 120, and requests a power level from the EECM 124.

The controller 128 may comprise any suitable microprocessor, microcontroller, personal computer, etc., which has central processing unit capable of executing a control program and data stored in a memory. When activated, the controller 128 carries out a series of operations stored in an instruction-by-instruction format in memory for providing engine control, diagnostic and maintenance operations. The controller 128 may be a dedicated controller specific to the present invention, or implemented in software stored in the main vehicle electronic control module.

Further, although software based control programs are usable for controlling system components in various modes of operation as described above, it will also be understood that the control can also be implemented in part or whole by dedicated electronic circuitry.

Referring now to FIG. 3, shown is a schematic diagram of the apparatus of the present invention. FIG. 3 shows a fuel cell stack 60 surrounded by an enclosure supporting the stack, the stack chassis 62. The stack chassis 62 is connected to ground 64. The coolant (not shown) creates an electrical connection between the fuel cell stack 60 and the stack chassis 62, which electrical connection possesses a resistance which is represented by R1. A first voltage measuring device, such as a voltmeter V1, measures the voltage across the coolant (the coolant voltage) between the positive terminal 68 (FC+) of the fuel cell stack 60 and the grounded stack chassis 62. A material having a fixed resistance, represented on the diagram as R2, is disposed between the negative terminal 70 (FC−) of the fuel cell stack 60 and the grounded stack chassis 62.

In this manner, a relative level of conductivity in the coolant can be determined through measurement of voltage across the coolant and compared to a threshold value for stack diagnostics, and possibly for stack shut-down. Specifically, and referring now to FIG. 4, such a procedure begins with step 80 and proceeds to step 82, where the voltage across the coolant (the coolant voltage) is read with voltmeter V1. The voltage measurement provided by voltmeter V1 is an indicator of the level of conductivity in the coolant. The higher the coolant voltage, the lower the conductivity of the coolant; and the lower the coolant voltage, the higher the conductivity of the coolant. In step 84, the voltage read in step 82 is compared to a first predetermined voltage level. The first predetermined voltage level is a voltage level across the coolant where the coolant becomes excessively conductive. In one aspect of the invention, the first predetermined voltage level is calculated according to the following formula:

stack voltage*R1/(R1+R2)=voltage level where:
stack voltage=the voltage (in volts) between the positive terminal 68 and the negative terminal 70 of the fuel cell stack 60;
R1=a minimum threshold resistance value for R1 (in ohms); and
R2=a fixed resistance disposed between the negative terminal 70 of the fuel cell stack 60 and the grounded stack chassis 62.

The value for the resistance R1 (in ohms) corresponds to a level of conductivity in the coolant where the coolant becomes excessively conductive. It is calculated by multiplying the value of the resistance R1 in ohms per volt by the stack voltage in volts. By example, a value of the resistance R1 in ohms per volt corresponding to an excessively conductive coolant would be 500 ohms per volt. Preferably, the stack voltage is the design voltage of the stack. If the stack voltage is 200 volts, then the resistance R1 would be limited to 500 ohms/volt*200 volts=100,000 ohms. In the example where R1 is 100,000 ohms, R2 is 500,000 ohms, and stack voltage is 200 volts, the first predetermined voltage level used for comparison in step 84 would be:

200 volts*100,000 ohms/(100,000+500,000) ohms=33.33 volts.

Alternatively, the first predetermined voltage level is zero volts. If the coolant voltage is zero volts, it indicates a short circuit across the stack. This could happen, for example, if a tool fell across the stack.

In step 84, if the coolant voltage read in step 82 is less than or equal to the first predetermined voltage level, then it is reported in step 86. An unacceptable level of conductivity of the coolant, and thus excessive leakage current in the coolant, is indicated when the coolant voltage is at or below this first predetermined voltage level. In this aspect of the invention, the report could be a signal the controller 128 would use to shut down the fuel cell operation. The procedure then ends at step 88.

Returning to step 84, if the coolant voltage read in step 82 is greater than the first predetermined voltage level, the procedure advances to step 90, where the coolant voltage read in step 82 is compared to a second predetermined voltage level. This second predetermined voltage level is also calculated using the following formula:

stack voltage*R1/(R1+R2)=voltage level, where:
stack voltage=the voltage (in volts) between the positive terminal 68 and the negative terminal 70 of the fuel cell stack 60;
R1=a resistance value for R1 (in ohms); and
R2=a fixed resistance disposed between the negative terminal 70 of the fuel cell stack 60 and the grounded stack chassis 62.

When determining the second predetermined voltage level, a higher value of R1 in ohms per volt is used than that used to calculate the first predetermined voltage level, corresponding to a lower level of conductivity in the coolant. This second predetermined voltage level provides an alarm, or other signal, prior to the coolant reaching an excessively conductive level, i.e., the coolant voltage is less than 33.33 volts in the example above. If the value of the resistance R1 in ohms per volt indicating excessive conductivity is 500 ohms per volt, a value of the resistance R1 in ohms per volt indicating that conductivity is approaching excessive levels would be, for example, 600 ohms per volt. If the stack voltage is 200 volts, then the resistance R1 would be limited to 600 ohms/volt*200 volts=120,000 ohms. In the example where R1 is 120,000 ohms, R2 is 500,000 ohms, and stack voltage is 200 volts, the second predetermined voltage level used for comparison in step 90 would be:

200 volts*120,000 ohms/(120,000+500,000) ohms=38.71 volts.

In step 90, if the voltage across the coolant read by voltmeter V1 in step 82 is less than or equal to the second predetermined voltage level, then it is reported in step 92. In this aspect of the invention, the report could be an external alarm or some other diagnostic signal generated by the controller 128 indicating a warning of the increase in conductivity. The procedure then ends at step 88.

Returning to step 90, if the voltage across the coolant read by voltmeter V1 in step 82 is greater than the second predetermined voltage level, the procedure ends at step 88. The procedure runs at predetermined intervals from application of power to the controller 128, or from the time of start-up of the fuel cell stack, until shut-down of the fuel cell stack.

The invention as described performs a comparison of coolant voltage to two predetermined voltage levels. In another aspect of the invention, only one voltage level is computed, the first predetermined voltage level. Therefore, only one comparison is made. In this aspect, the first predetermined voltage level could be equivalent to one of the predetermined voltage levels previously discussed, or some other value. Reporting would comprise one of a signal used to shut down the system, an external alarm, or some other diagnostic signal indicating a warning of the increase in conductivity.

Before the procedure ends at step 88 of FIG. 4, an optional aspect of the invention calculates the resistivity and conductivity of the coolant during stack operation through the procedure shown in FIG. 5, beginning at step 94. In step 96, a voltmeter V2 is used to measure the actual stack voltage. The value of the resistance R1 is calculated in step 98 according to the following formula:

$$R2*coolant\ voltage/(stack\ voltage-coolant\ voltage)=R1,$$

where:

R2=a fixed resistance (in ohms) disposed between the negative terminal 70 of the fuel cell stack 60 and the grounded stack chassis 62;

coolant voltage=the voltage (in volts) across the coolant read with voltmeter V1 in step 82; and stack voltage=the voltage (in volts) between the positive terminal 68 and the negative terminal 70 of the fuel cell stack 60, read with the voltmeter V2 in step 96.

By example, if R2 is 500,000 ohms, the stack voltage is 200 volts, and the coolant voltage is 75 volts, the value for R1 calculated in step 98 would be:

$$500{,}000\ ohms*75\ volts/(200-75)\ volts=300{,}000\ ohms.$$

This resistance R1 is converted to a value for resistivity of the coolant in step 100. In one aspect of the invention, the resistivity is calculated according to the following formula:

$$A*R1/L=\rho$$

where:

$\rho$=the resistivity of the coolant;

A=the surface area of the plumbing 50, 52 and 54; and

L=the distance between the fuel cell stack 60 and the stack chassis 62.

Also by example, if R1 is 300,000 ohms, L is 10 cm, and A is 5 cm$^2$, then the resistivity of the coolant would be:

$$5\ cm^2*300{,}000\ ohms/10\ cm=150{,}000\ ohm\text{-}cm.$$

The resistivity of the coolant calculated in step 100 is reported in step 102. Conductivity is the reciprocal of resistivity, so in step 104, the resistivity is used to calculate conductivity. Using the resistivity of the above example, conductivity calculated in step 104 would be 6.67 ×10$_{-6}$ siemans/cm. The conductivity is reported in step 106, and this optional procedure ends at step 108.

While this invention has been described in terms of certain embodiments thereof, it is not intended that it be limited to the above description, but rather only to the extent set forth in the following claims.

The embodiments of the invention in which an exclusive property or privilege is claimed are defined in the following claims.

What is claimed is:

1. A method for detecting leakage current in a coolant of a fuel cell stack with a positive and a negative terminal and a stack chassis, comprising the steps of:

disposing a material having a fixed resistance between the negative terminal of the stack and the stack chassis;

measuring a coolant voltage between the positive terminal of the stack and the stack chassis;

comparing the coolant voltage to a first predetermined voltage limit; and reporting when the coolant voltage is at or below the first predetermined voltage limit.

2. The method according to claim 1, wherein the reporting is conducted when the first predetermined voltage level is zero volts.

3. The method according to claim 1, further comprising the steps of:

comparing the coolant voltage to a second predetermined voltage limit; and reporting when the coolant voltage is at or below the second predetermined voltage limit.

4. The method according to claim 1, further comprising the steps of:

measuring a stack voltage between the positive terminal and the negative terminal of the stack;

calculating a resistance of the coolant; and calculating a resistivity of the coolant from the resistance.

5. The method according to claim 4, further comprising the step of:

calculating a conductivity of the coolant from the resistivity.

6. An apparatus for detecting leakage current in a coolant of a fuel cell stack with a positive and a negative terminal and a stack chassis, comprising:

a material having a fixed resistance disposed between the negative terminal of the stack and the stack chassis;

a first voltage measuring device to measure a coolant voltage between the positive terminal of the stack and the stack chassis;

means for comparing the coolant voltage to a first predetermined voltage limit; and means for reporting when the coolant voltage is at or below the first predetermined voltage limit.

7. The apparatus according to claim 6, further comprising:

means for comparing the coolant voltage to a second predetermined voltage limit; and means for reporting when the coolant voltage is at or below the second predetermined voltage limit.

8. The apparatus according to claim 6, further comprising:

a second voltage measuring device for measuring a stack voltage between the positive terminal and the negative terminal of the stack;

means for calculating a resistance of the coolant; and means for calculating a resistivity of the coolant from the resistance.

9. The apparatus according to claim 8, further comprising:

means for calculating a conductivity of the coolant from the resistivity.

* * * * *